United States Patent Office 3,689,285
Patented Sept. 5, 1972

3,689,285
METHOD FOR MAKING A FOOD PRODUCT
Gordon S. Griffin, 512 Hollybrook Drive, New Whiteland, Ind. 46184, and Hormoz K. Broumand, 6404 Hoover Road, Indianapolis, Ind. 46260
No Drawing. Continuation-in-part of application Ser. No. 876,986, Nov. 14, 1969, which is a continuation-in-part of application Ser. No. 832,851, June 12, 1969. This application June 11, 1971, Ser. No. 152,364
Int. Cl. A22c *18/00*
U.S. Cl. 99—108           11 Claims

ABSTRACT OF THE DISCLOSURE

A method comprising the steps of placing water and finely ground cereal selected from the group consisting of corn, soy and rice and combinations thereof in a cooker and cooking the mixture of water and cereal, adding finely ground meat to the mixture, continuing cooking the mixture of water, cereal and meat until it forms a fluent coherent mass of solid particles, and compacting the mass into discrete pieces. The discrete pieces are preferably blast frozen for handling and packaging either before or after cooking, e.g., by deep frying. The compacting step may be carried out by stuffing said mass into casings to provide said discrete pieces, which casings are removed after the pieces or at least the outer surfaces thereof are frozen.

---

This in a continuation-in-part application based on our prior copending application Ser. No. 876,986, filed Nov. 14, 1969 which was a continuation-in-part application based on our prior, then copending, application Ser. No. 832,851 filed June 12, 1969 both now abandoned.

It is a primary object of our invention to provide a food product containing meat and corn, soy or rice, or combinations thereof, which product can be provided in the form of conventional hot dogs and wieners, i.e., in the shape of a hot dog or wiener. Specifically, it is an object of our invention to provide a food product including finely ground corn, soy or rice or combinations thereof and finely ground meat, which product can be formed into discrete pieces such as by compacting or extruding without the use of conventional casings.

Hot dogs and wieners are conventionally formed by stuffing the meat mixture thereof into an artificial casing which is subsequently removed after the hot dogs and wieners are cooked and thereby formed into semi-solid members which will hold together without the casing. In some cases, frankfurters are formed by stuffing meat product into edible casings which are left on the product. Since many processing concerns are married to this conventional casing process, we have developed our product so that it can be formed by using casings and such conventional processing equipment as well as by extruding or compacting without casings. One object of our present invention, therefore, is to provide a method of compacting or forming discrete pieces of a cereal-meat mass by stuffing the mass into tubular casings to provide discrete pieces, freezing at least the outer surfaces of said pieces, and then removing the casings.

Another object of our invention is to provide a method for mixing and cooking water, finely ground corn or rice or combinations thereof and finely ground meat to provide a fluent, coherent mass of solid particles which can be compacted by extruding into links having a desired diameter and a desired length using conventional and well-known extrusion equipment such as that which is used to extrude caseless, all-meat link sausages. In such conventional extrusion machines, the material to be extruded is pumped into cylinders and then removed from the cylinders by rams. It is for this reason that we mix and cook the water, cereal and meat until it forms a fluent, coherent mass of solid particles, which mass can be pumped or otherwise stuffed into such an extrusion machine.

In this description and in the claims appended hereto, we refer to ground corn, soy or rice. Such terminology is meant to refer to corn meal or corn flour; rice meal or rice flour; or soy meal, soy grits, soy flour, soy protein concentrate or isolated soy protein. Also, in this description and in the claims appended hereto, we refer to ground meat. By this terminology, we mean pork, beef, lamb or the like which is ground in a conventional grinder using, for instance, a 1/8 inch breaker plate; poultry and seafood, e.g., shrimp, fish or crabmeat, which is finely shredded to a similar particle size; or finely ground pork, beef, lamb or the like to which has been added a "synthetic meat" commonly referred to as textured or spun soy protein. We have found that the combination of, for instance, natural pork and textured soy protein provides a desirable product from a taste standpoint.

One object of our invention is to provide a food product having the taste characteristics of a conventional tamale, but which does not have the manufacturing, cooking and handling problems associated with tamales. Thus, to the mixture of water, corn and meat, we may add tomato paste and a spice mixture to provide a food product which tastes like a tamale. The particular spices used, of course, are selected to provide the desired taste. Since conventional tamales are rather unhandy to heat and serve, we have developed a food product which is prepared and served preferably by deep frying discrete pieces or links for a period of time ranging from four to six minutes and at a temperature ranging from 360° F. to 375° F. It generally takes one hour to steam frozen conventional tamales to a serving condition. Our proposed method is such that the discrete pieces may be quick frozen and then stored in freezers until they are deposited into the deep fryer or other cooking apparatus. That is, our method includes the steps of forming the coherent mass of water, corn and meat into discrete pieces and then promptly placing the pieces in a conventional blast freezer which is held at a temperature ranging, for instance, from −30° F. to −40° F. and which includes blowers providing air movement equivalent to, for instance, 30 to 40 miles per hour winds. The quick freezing operation increases the storage life of our product. However, in some cases, we can merely refrigerate the pieces for storage before deep frying and, in other cases, we can deep fry or otherwise cook the pieces before they are frozen.

Another object of our invention is to combine finely ground meat and finely ground corn, soy or rice or combinations thereof and selected spices in accordance with the method of our invention to provide food products having a wide variety of tastes, textures, etc. In those products, we may use, as the finely ground meat, textured soy protein, beef, pork, lamb, poultry, fish, shrimp, crab or lobster or combinations thereof. These various combinations of cereal and meat can be spiced to provide any type of snack food relating to a country or region.

We prefer to mix with the water, cereal and meat a heat-coagulable stabilizer or gum such as methyl cellulose. We prefer to use, by weight before cooking, approximately 0.7% to 1% stabilizer which is primarily methyl cellulose. Most gums do not jell in heat and are not heat-coagulable. Methyl cellulose does jell in heat and does serve as a binder which is activated by the cooking and deep frying steps. Generally, in making the product which has the taste characteristics of a tamale, we prefer to add the methyl cellulose at the same time we add the spices and the tomato paste to the water, corn and meat mixture. Further, we have used starches, e.g., corn starch, and protein, e.g., egg whites or wheat gluten as stabilizer additives.

It will be appreciated that the stated components of our product may be added to the mixture thereof in various proportional amounts to provide desired end results. For instance, our method may be used when the water, cereal and meat comprise, respectively, 30% to 70%, 10% to 40%, and 15% to 50% by weight before cooking of the total mixture. In making the tamale-like product discussed above, we have discovered that good product characteristics, from a taste and processing standpoint, are obtained when the water, corn and meat comprise, respectively, approximately 50%, 20% and 25% by weight before cooking of the total mixture. In this preferred range, the tomato paste comprises 3% of the total mixture while the spice mixture, including the methyl cellulose stabilizer, comprises 2% of the total mixture. Further, we have found that a very suitable product is obtained when the meat is pork and approximately 50% of the meat is fat. Still further, we have found that a very suitable product is obtained when, for instance, ten percent of the corn is corn starch.

We have discovered that one important element in providing a product, such as our cereal and meat product, which can be formed, for instance, by extrusion, is to mix and cook the product in such a manner as to control its moisture content. A product which is too moist or which is too dry will not extrude properly. One aspect of moisture control in our process involves the use of methyl cellulose which, we believe, helps in the moisture control. Further, the adding of the meat to the water and cereal mixture at the proper time is a factor in the moisture control.

Another aspect of our method for providing a cereal-meat product which is mixed and cooked in such a manner that it can be formed, for instance, by extrusion is the harmonizing of the gelatinizing properties of the cereal with the binding properties of the meat. That is, one of our preferred methods takes advantage of the gelatinizing properties of corn, soy and rice and the binding properties of meat to provide a coherent mass of solid particles which is somewhat fluent so that it can be compacted or extruded. The raw meat is, therefore, preferably mixed with the water and cereal mixture at the time when the cereal starts to gelatinize.

For instance, corn starts to gelatinize in the temperature range of 145° F. to 190° F. Preferably, the meat is added raw to take advantage of the binding properties of the raw protein in the meat before it is cooked. We have discovered that, when the meat is cooked prior to its being added to the water and cereal mixture, the resultant mass is not so coherent as it is when the meat is added to the mixture while it is raw. We believe that if we add cooked meat, we must rely solely on the gelatinizing properties of the cereal as well as the stabilizers which may be used.

We use corn, soy and rice because these three cereals will, when finely ground and cooked in water, gelatinize as well as thicken. In some cases, we mix corn starch or other starches with the corn, soy and rice.

The initial steps in our method include the placing of water into a cooker and then initially heating the water. We prefer to use a steam jacketed cooker with an agitator and a side and bottom scraper. The steam jacketed heater provides a uniform heat to the mixture contained therein and the agitator and scrapers keep the cereal and water mixture from sticking to the walls of the cooker. The water, of course, may be initially heated outside the cooker.

In using corn, we prefer initially to heat the water to a temperature ranging from 120° F. to 140° F. and to add the corn to the water while it is in this range of temperature. We have found that it is better to pre-wet or pre-soak the corn before it is placed in the hot water. This pre-wetting or pre-soaking prevents or substantially eliminates lumping of the corn which is finely ground. After the corn is added to the water and the mixture is further cooked or heated to a temperature ranging from 145° F. to 155° F., we prefer to add the finely ground raw meat while the water and corn mixture are held at this last said temperature range. It will be remembered that the corn starts to gelatinize in the temperature range of 145° F. to 155° F. After the meat is thus added to the water and corn mixture, the resultant mixture is cooked for a period of time ranging from fifteen minutes to one hour at temperatures which will generally range from 160° F. to 190° F. We have found that cooking the water, corn and meat mixture for a period of time ranging from 20 minutes to 30 minutes at temperatures ranging from 160° F. to 190° F. will produce very satisfactory results. This last step of cooking the mixture of water, corn and meat for that period of time and at that temperature fully cooks the meat and the corn. Further, after the mixture of water, corn and meat has so cooked for a period of time ranging from 15 minutes to one hour, it will form what we have referred to as a fluent, coherent mass of solid particles which we can then pump to an extrusion machine which will form discrete pieces or links of our product. Promptly as soon as the discrete pieces are formed, we may place them in a blast freezer for freezing before cooking or we may cook them and then place them in a blast freezer. In some cases, however, the pieces may be merely refrigerated without freezing for cooking at a later time.

Preferably, the extruded pieces, even before the freezing step, will be quite firm to the touch and capable of holding their shape in a room temperature environment. In other words, the pieces will preferably be compacted during the forming step to the point where they are quite firm. However, we have achieved desirable results by chilling the fluent coherent mass to a temperature of approximately 45° F. before and during the extrusion process. Such pieces, when deep fried or otherwise cooked after the forming operation, will be self-supporting and will maintain their shape.

An additional step in the method just described and a step which we prefer to use is the adding of a heat-coagulable stabilizer, such as methyl cellulose, to the mixture of corn and water at the same time that the raw meat is added. A further additional step is the adding of corn starch to the corn before the corn is added to the water. The corn starch may be added in amounts approximately equal to ten percent of the weight of the corn before cooking.

One variation of our method comprises the steps of heating the water in the cooker to a temperature ranging from 150° F. to 180° F., and then adding the finely ground cereal selected from the group consisting of corn, soy and rice and combinations thereof to the water. The water and cereal mixture is then cooked to a temperature ranging from 175° F. to 190° F., at which time the finely ground raw meat is added to the mixture. We then continue cooking the mixture of water, cereal and meat at a temperature ranging from 175° F. to 190° F. for 20 to 40 minutes until it forms a fluent coherent mass of solid particles. Then we compact portions of the mass into discrete pieces. In this variation of the process, the water, cereal and meat may comprise, respectively, 40% to 60%, 10% to 20% and 30% to 50% by weight of the total mixture before cooking. We have found that a particularly suitable product is obtained when the water, cereal and meat comprise, respectively, approximately 50%, 15% and 40% by weight of the total mixture before cooking.

Another variation of our method is to heat the water in the cooker until it boils and then to add the corn to the water and to continue cooking the water and corn mixture for a period of time ranging from 15 minutes to one hour at temperatures ranging from 170° F. to 180° F., after which time we add the raw meat and spices and tomato sauce to the mixture and let it set for a period of time without applying external heat thereto. In this particular method, the meat is only partially cooked and it is necessary to depend upon the subsequent deep frying processes in order properly to cook the meat.

Another variant of our method is to add the raw meat to the water and corn mixture after it has been cooked at 170° F. to 180° F. for a period of time ranging from 15 minutes to one hour and then to continue cooking the mixture until the meat is fully cooked. In this method, we add the spice mixture and tomato sauce and stabilizer at the same time that we add the meat.

In some cases, as indicated earlier, we prefer to chill the mixture of water, corn and meat after cooking and before extrusion. This step provides a mass which is somewhat easier to handle than a mass which is not chilled. It will be appreciated that this chilling tends to solidify the mixture and particularly the meat fat particles in the mixture.

The following ingredients, given in percentage parts by weight before cooking, are mixed and cooked as discussed previously to provide the fluent, coherent mass of solid particles particularly suited for our tamale-like product:

| | Percent |
|---|---|
| Water | 52.15 |
| Corn | 10.63 |
| Meat | 26.24 |
| Corn starch | 1.32 |
| Tomato paste | 5.31 |
| Spices | 3.35 |
| Methyl cellulose | 1.00 |

The coherent mass of this example is preferably stuffed into link-shaped casing as part of the forming step. While in the casings, the mass is chilled or frozen so that it will maintain its link shape when the casings are stripped away. While chilled or frozen, and after the casings are stripped away, the discrete pieces of the mass are placed in a deep fryer or other cooking apparatus for cooking. We have discovered that freezing each discrete piece or at least the outer surface thereof provides a product which will not tend to disintegrate during the cooking operation and which is easier to handle before the cooking operations, especially during the process of stripping the casings. Freezing at least the outer surfaces of said pieces requires, for instance, blast freezing for 15 minutes or freezing in a conventional freezer for one hour. The temperature in the blast freezer is probably between —20° F. and —40° F. with the air moving at a rate of 20 to 40 thousand cubic feet per minute. The temperature in a conventional freezer, for instance, is approximately —10° F. It will be appreciated that the exact time for freezing at least the outer surface of such pieces disposed in such casings will depend on many factors, such as the capacity of the freezing equipment, the amount of material placed in the equipment, the temperature of the material when it is placed in the equipment, the amount of water in the material, etc. The discrete pieces made in accordance with our method will have their outer surfaces frozen to the point that the pieces can be handled during the casing removal process after the pieces have spent approximately 15 minutes in such a blast freezer. In a conventional freezer held at a temperature of —10° F., our pieces will have the outer surfaces thereof frozen sufficiently, we believe, in a period of time ranging from 20 minutes to 40 minutes. They can be left, for instance, one hour in such a freezer to assure that the surfaces are sufficiently frozen. The size of each discrete piece will, of course, have a bearing upon the amount of time required for surface freezing or solid freezing. As indicated earlier, our snack food product will generally be provided in sizes ranging up to, for instance, the size of a conventional hot dog.

Another example of our method involves the making of a pizza snack. The following ingredients, given in percentage parts by weight before cooking, are mixed and cooked in the following described manner to provide a fluent, coherent mass of solid particles particularly suited for our pizza snack:

| | Percent |
|---|---|
| Water | 40 |
| Rice | 10 |
| Meat | 40 |
| Other ingredients, including tomato paste, Parmesan cheese, seasoning ingredients and methyl cellulose | 10 |

A mixture of three parts water and one part rice is provided and cooked to a temperature ranging from 180° F. to 200° F. for a period of time ranging from 20 minutes to 40 minutes, at which time the ground meat is added to the water and cereal mixture and blended. Then, additional water, together with a mixture of the seasoning ingredients and methyl cellulose, is blended into the water, cereal and meat mixture to produce a resulting mixture, the temperature of which is not permitted to drop below, for instance, 40° F. to 70° F. It will generally take from 20 to 60 minutes for this step to be completed. This particular process can be varied by including the water, cereal and meat in amounts comprising, respectively, 40% to 55% 10% to 20% and 40% to 55% by weight of the total mixture before cooking. For instance, the cereal may be 4 parts rice and 1 part soy.

Further, at the time the additional water is added, it may be at a temperature ranging from, for instance, 40° F. to 100° F. and a part of that water may be used to moisten the mixture of seasoning ingredients and methyl cellulose. We have heated the additional water to a temperature of approximately 180° F. and obtained satisfactory results. We prefer to blend together the dry powdery mixture of seasoning ingredients and methyl cellulose so that the methyl cellulose is introduced to the total mixture blended with other materials.

As a part of the pizza snack method, we grind the fluent coherent mass discussed above through a conventional breaker plate before the compacting step. Then, we generally prefer to perform the compacting step by stuffing the mass into tubular casings to provide discrete pieces. Then, we freeze the discrete pieces or at least their outer surfaces as discussed previously and then remove the casings.

As another example, we have a method of making a pizza snack similar to the above-described method for pizza snacks with the exception that this method involves additional cooking or heating the resulting mixture after the meat is added. In this method, since additional heating and cooking is involved, additional water is utilized. Particularly, in this method, the water, cereal and meat comprise, respectively, 40% to 60%, 10% to 20% and 30% to 55% by weight of the total mixture before cooking. The mixture of water and cereal is heated to a temperature ranging from 180° F. to 200° F. and then cooked at that temperature for a period of time ranging from 20 minutes to 40 minutes. Then the ground meat is added to the water and cereal mixture and blended into that mixture. Additional water, together with a mixture of seasoning ingredients and methyl cellulose, is blended into the mixture of water, cereal and meat while heat is added to the resultant mixture to raise its temperature to a range between 180° F. and 195° F. The length of time that it will take for the mixture to reach a temperature range between 180° F. and 195° F. depends on several factors including the amount of heat applied and the mass of the mixture. We generally accomplish this step in 5 to 20 minutes of time. The resulting fluent coherent mass is then ground through a conventional breaker plate and stuffed into casings as discussed previously to provide the discrete pieces.

In the pizza snack method described above, we have found that the meat may be provided by using fresh pork with 20% fat content ground through a ½ inch diameter plate, keeping the ground meat at a temperature of approximately 45° F. or below until it is used. With this fresh pork, we use chunk-size unflavored, uncolored, textured soy protein, rehydrated with three parts hot (160° F.) water for 15 minutes at room temperature. We have found that a desirable product, from a taste standpoint, is achieved when the meat in the snack is 50% fresh pork and 50% textured soy protein.

In the methods described above, we have found it satisfactory to use broken rice, soaking the rice for 30 minutes with one part rice and three parts water. Then the mixture of water and rice is brought to a boil, covered, and the heat is lowered to allow all the water to be absorbed. We have successfully used the hot cooked rice at a temperature of 175° F. in the method for providing the partially cooked pizza snack described above.

We have discovered that cereal-meat products manufactured using our method will maintain their shape and not disintegrate when cooked by deep fat frying, pan frying, boiling, boiling in a plastic bag, broiling, baking and microwave processes. We believe that this feature has not, heretofore, been accomplished.

Our method involves forming a fluent, coherent mass of meat and cereal products into discrete pieces. We accomplish this by compacting portions of the mass into discrete pieces. The compacting operation may be accomplished in a number of ways. We prefer to accomplish it by extruding portions of the mass or by stuffing portions of the mass into tubular casings which are subsequently removed. It will be appreciated that portions of the mass may be compacted or stuffed into any number of types of molds for defining the shape of the discrete pieces.

What is claimed is:

1. The method of making a food product comprising the steps of providing a mixture of water and finely ground cereal selected from the group consisting of corn, soy and rice and combinations thereof, cooking the mixture of water and cereal to a temperature ranging from 180° F. to 200° F. for a period of time ranging from 20 minutes to 40 minutes, adding raw ground meat to said water and cereal mixture and blending said meat with said mixture, adding additional water together with a mixture of seasoning ingredients and methyl cellulose, blending the resulting mixture for 20 to 60 minutes while preventing the temperature thereof from dropping below a temperature ranging from 40° F. to 70° F. to provide a fluent coherent mass of solid particles, and compacting portions of said mass into discrete pieces, said water, cereal and meat comprising respectively 40% to 55%, 10% to 20% and 40% to 55% by weight of the total mixture before cooking, and said methyl cellulose comprising approximately 0.7% to 1% by weight of the total mixture before cooking.

2. The method of claim 1 including the step of grinding said fluent coherent mass before said compacting step.

3. The method of claim 2 in which said compacting step includes stuffing said mass into tubular casings to provide said discrete pieces, freezing said discrete pieces, and removing said casings.

4. The method of making a food product comprising the steps of providing a mixture of water and finely ground cereal selected from the group consisting of corn, soy and rice and combinations thereof, heating the mixture of water and cereal to a temperature ranging from 180° F. to 200° F., cooking the cereal and water for a period of time ranging from 20 minutes to 40 minutes at said temperature, adding raw ground meat to said water and cereal mixture and blending said meat with said mixture, adding additional water together with a mixture of seasoning and methyl cellulose, continually blending the resulting mixture while adding heat thereto to raise the temperature of the mixture to 180° F. to 195° F., thereby to provide a fluent coherent mass of solid particles, and compacting said mass into discrete pieces, said water, cereal and meat comprising respectively 40% to 60%, 10% to 20% and 30% to 50% by weight of the total mixture before cooking and said methyl cellulose comprising approximately 0.7 to 1.0% by weight of the total mixture before cooking.

5. The method of claim 4 including the step of grinding said fluent coherent mass before said compacting step.

6. The method of making a food product comprising the steps of placing water in a cooker and heating the water to a temperature ranging from 150° to 180° F., adding finely ground cereal selected from the group consisting of corn, soy and rice and combinations thereof to said water and cooking the mixture of water and cereal to a temperature ranging from 175° F. to 190° F., adding finely ground raw meat to said mixture, continuing cooking the mixture of water, cereal and meat at a temperature ranging from 175° F. to 190° F. for 20 minutes to 40 minutes until it forms a fluent coherent mass of solid particles, compacting portions of said mass into discrete pieces, said water, cereal and meat comprising, respectively, 40% to 60%, 10% to 20% and 30% to 50% by weight of the total mixture before cooking.

7. The method of claim 6 in which said compacting step includes placing said mass of solid particles into an extrusion machine and extruding compacted lengths of said mass.

8. The method of claim 7 including the step of chilling the fluent coherent mass to a temperature of approximately 45° F. before beginning the extrusion process and during the extrusion process.

9. The method of claim 6 in which said compacting step includes stuffing said mass into tubular casings to provide said discrete pieces, freezing at least the outer surfaces of said pieces, and removing the casings.

10. The method of claim 6 in which said compacting step includes stuffing said mass into tubular casings to provide said discrete pieces, freezing said pieces, and removing the casings.

11. The method of claim 6 in which the cereal is corn and in which the step of cooking the mixture of water and corn and meat includes cooking the mixture for a period of time ranging from 20 minutes to 30 minutes at a temperature ranging from 160° F. to 190° F.

References Cited

UNITED STATES PATENTS 2,798,814    7/1957    Rivoche _____ 99—194 X

OTHER REFERENCES

Lord: "Everybody's Cookbook," 1937, published by Harcourt, Brace & Co., New York, pp. 190, 191, cornmeal mush and p. 494, tamale pie.

HYMAN LORD, Primary Examiner

U.S. Cl. X.R.

99—194